United States Patent
Panosyan et al.

(10) Patent No.: US 11,320,794 B2
(45) Date of Patent: May 3, 2022

(54) SYSTEMS AND METHODS FOR HIGH RATE-OF-CHANGE-OF-FREQUENCY RIDE-THROUGH IN ELECTRIC POWER SYSTEMS

(71) Applicant: General Electric Company, Schenectady, NY (US)

(72) Inventors: Ara Panosyan, Niskayuna, NY (US); Sreedhar Desabhatla, Niskayuna, NY (US); Luca Parolini, Niskayuna, NY (US); Adolfo Anta Martinez, Niskayuna, NY (US); Naresh Acharya, Niskayuna, NY (US); Krishna Kumar Anaparthi, Niskayuna, NY (US); Scott William Szepek, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 108 days.

(21) Appl. No.: 16/615,972

(22) PCT Filed: May 23, 2017

(86) PCT No.: PCT/US2017/034014
§ 371 (c)(1),
(2) Date: Nov. 22, 2019

(87) PCT Pub. No.: WO2018/217189
PCT Pub. Date: Nov. 29, 2018

(65) Prior Publication Data
US 2020/0096960 A1 Mar. 26, 2020

(51) Int. Cl.
*G05B 19/042* (2006.01)
*H02J 3/38* (2006.01)
*H02J 3/46* (2006.01)

(52) U.S. Cl.
CPC ............ *G05B 19/042* (2013.01); *H02J 3/381* (2013.01); *H02J 3/46* (2013.01); *G05B 2219/2639* (2013.01); *H02J 2203/20* (2020.01)

(58) Field of Classification Search
CPC .......... G05B 19/042; G05B 2219/2639; G05B 13/02; H02J 3/381; H02J 3/46;
(Continued)

(56) References Cited

U.S. PATENT DOCUMENTS 7,313,465 B1 * 12/2007 O'Donnell ............. G06Q 50/06
700/291
8,922,043 B1 * 12/2014 Kang ...................... F03D 7/043
290/44

(Continued)

FOREIGN PATENT DOCUMENTS

EP 2 876 768 A1 5/2015

OTHER PUBLICATIONS

Loutan, C et al., "Frequency Control Issues and Related Operational Experience/Efforts to manage Operational Impacts," NERC / NREL / PJM Inverter-Based Generation Interconnection Workshop, dated Apr. 11, 2012, DOI: 10.1827/mnsc.1090.1068, Retrieved from Internet URL: http://mydocs.epri.com/docs/publicmeetingmaterials/4-17-2012/13-Frequency-Control-Issues-and-Related-Operational-Experience-Efforts-Clyde-Loutan.pdf on Nov. 18, 2019, pp. 1-10.
(Continued)

*Primary Examiner* — Thomas C Lee
*Assistant Examiner* — Charles Cai
(74) *Attorney, Agent, or Firm* — Armstrong Teasdale LLP

(57) ABSTRACT

An electric power system includes a generating unit, which includes a controller for controlling an operational mode of the generating unit. The electric power system also includes an event estimator communicatively coupled to the controller of the generating unit and a network estimator communicatively coupled to the event estimator. The network estimator includes a processor configured to receive status information associated with the electric power system, determine, based upon the status information, at least one characteristic of the electric power system, and transmit the at least one characteristic to the event estimator.

20 Claims, 2 Drawing Sheets

(58) Field of Classification Search
CPC ...... H02J 2203/20; H02J 2300/10; H02J 3/48; H02J 13/0006; Y02E 60/00; Y02E 40/70; Y04S 40/20; Y04S 10/12
See application file for complete search history.

(56) References Cited

U.S. PATENT DOCUMENTS

| | | |
|---|---|---|
| 9,541,062 B2 | 1/2017 | Yin et al. |
| 2007/0055392 A1* | 3/2007 | D'Amato ............ G05B 13/048 700/44 |
| 2012/0061963 A1* | 3/2012 | Thisted ................. H02J 3/06 290/44 |
| 2013/0218355 A1 | 8/2013 | Lazaris |
| 2014/0281645 A1 | 9/2014 | Sen et al. |
| 2015/0137518 A1 | 5/2015 | Yin et al. |
| 2017/0268487 A1* | 9/2017 | Yang ................... G05B 19/048 |

OTHER PUBLICATIONS

Villena-Lapaz J et al., "Evaluation of frequency response of variable speed wind farms for reducing stability problems in weak grids," Power Electronics and Machines in Wind Applications (PEMWA), 2012 IEEE, dated Jul. 16, 2012, DOI: 10.1109/PEMWA.2012. 6316375, Publisher: IEEE, pp. 1-6.
International Search Report of the International Searching Authority for PCT/US2017/034014 dated Feb. 19, 2018.

\* cited by examiner

FIG. 2

Start → Receive status information associated with an electric power system (202) → Determine, based upon status information, at least one characteristic of the electric power system (204) → Transmit the at least one characteristic to an event estimator of a generating unit (206) → End

FIG. 3

| RoCoF | Estimated frequency nadir | Estimated settling power | Estimated settling frequency |
|---|---|---|---|
| 0.2 | 0.35 | 15 | 0.05 |
| 0.3 | 0.41 | 17 | 0.09 |
| 0.4 | 0.43 | 18 | 0.13 |
| 0.5 | 0.46 | 21 | 0.18 |
| 0.6 | 0.51 | 24 | 0.22 |
| 0.7 | 0.54 | 25 | 0.26 |
| 0.8 | 0.59 | 27 | 0.29 |
| 0.9 | 0.63 | 29 | 0.34 |
| 1.0 | 0.70 | 30 | 0.38 |

SYSTEMS AND METHODS FOR HIGH RATE-OF-CHANGE-OF-FREQUENCY RIDE-THROUGH IN ELECTRIC POWER SYSTEMS

BACKGROUND

The field of the invention relates generally to control of electric power generation, and more particularly, to systems and methods for high rate-of-change-of-frequency ("RoCoF") ride-through in electric power systems.

Many known electric power systems include several types of electric power generating units, such as, for example, one or more synchronous generating units and/or one or more non-synchronous generating units. Synchronous generating units are those in which the output voltage waveform generated during operation is synchronized with the rotation of an element (often referred to as a "prime mover") within the generating unit. In other words, synchronous generating units typically include a rotating mass that rotates within the generating unit to generate output power. Non-synchronous generating units, on the other hand, are those in which the output voltage waveform generated during operation is not necessarily synchronized with the rotation of a mass within the generating unit, because, for example, the non-synchronous generating unit may not include such a rotating mass. Examples of non-synchronous generating units include, for example, solar and wind power generating units.

At least some conventional electric power systems have adequately tolerated the loss of one or more generating units or loss of loads within the electric power system through the presence of a large number of synchronous generating units distributed within the system. More particularly, because each synchronous generating unit includes a rotating mass (e.g., the prime mover and generator), it has conventionally been possible to compensate for the loss of a generating unit or loss of loads within the electric power system by distributing the deficit or surplus in electrical power within the system over the remaining number of generating units, which rotate with inertia sufficient to absorb, or "ride-through" the loss (although the rotating mass within each synchronous generating unit may turn more slowly).

However, as renewable energy technologies are developed and implemented on existing electric power systems, the number of rotating masses on such systems is decreased, and, as a result, many modern electric power systems are substantially less tolerant of generating unit loss during operation.

BRIEF DESCRIPTION

In one aspect, an electric power system is provided. The electric power system includes a generating unit, which includes a controller for controlling an operational mode of the generating unit. The electric power system also includes an event estimator communicatively coupled to the controller of the generating unit and a network estimator communicatively coupled to the event estimator. The network estimator includes a processor configured to receive status information associated with the electric power system. The processor is also configured to determine, based upon the status information, at least one characteristic of the electric power system, as well as to transmit the at least one characteristic to the event estimator.

In another aspect, a network estimator is provided. The network estimator includes a processor and a non-transitory, tangible, computer-readable memory having instructions stored thereon that, in response to execution by the processor, cause the processor to perform operations including receiving status information associated with the electric power system, determining, based upon the status information, at least one characteristic of the electric power system, and transmitting the at least one characteristic to an event estimator of the generating unit.

In yet another aspect, a method is provided. The method includes receiving, by a processor configured to be communicatively coupled to an event estimator of a generating unit within an electric power system, status information associated with the electric power system. The method also includes determining, by the processor and based upon the status information, at least one characteristic of the electric power system, and transmitting, by the processor, the at least one characteristic to the event estimator of the generating unit.

DRAWINGS

These and other features, aspects, and advantages of the present disclosure will become better understood when the following detailed description is read with reference to the accompanying drawings in which like characters represent like parts throughout the drawings, wherein:

FIG. 2 is a flow chart of an exemplary process for controlling at least one of the generating units of the electric power system shown in FIG. 1; and FIG. 3 shows an exemplary look-up table that correlates a plurality of RoCoF values with a plurality of electric power system characteristics.

Figure 1:
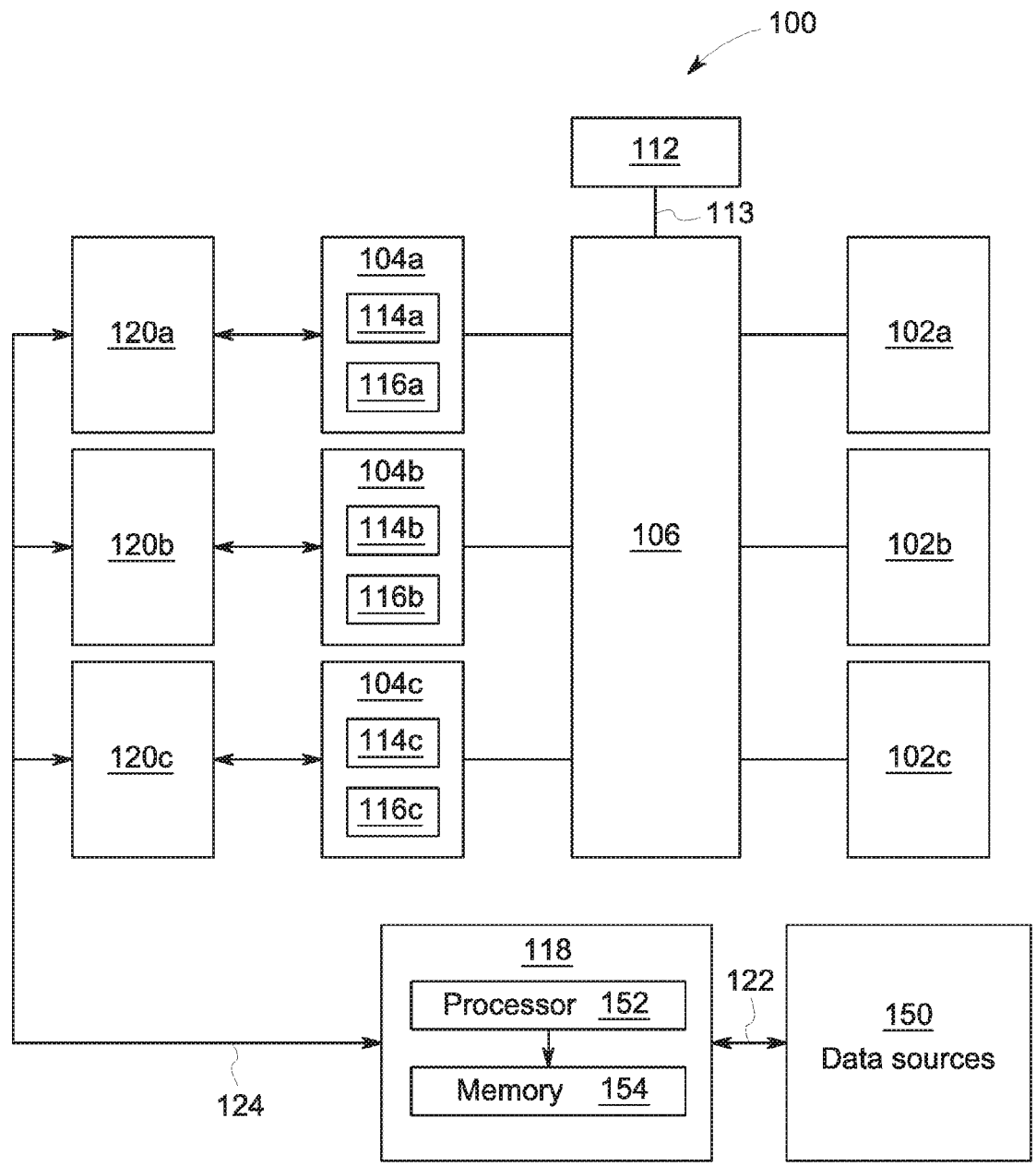
FIG. 1 is a schematic view of an exemplary electric power system that includes a plurality of generating units.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the phrase "tangible, non-transitory, computer-readable memory" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In addition, as used herein, the phrase "grid event" refers to an abrupt change in total electrical power consumed within and/or generated by an electric power system. For example, a grid event may be associated with a sudden reduction of total generation or load within an electric power system due, for example, to loss (or tripping) of one or more generating units, one or more non-synchronous power sources, and/or one or more loads.

In addition, as used herein, a "source rejection grid event" is an abrupt change in total electrical power generated by an electric power system, such as, for example, as a result of a loss of one or more generating units. Similarly, as used herein, a "load rejection event" is an abrupt change in total electrical power consumed by an electric power system, such as, for example, as a result of a loss of one or more loads.

These grid events may affect the power output by one or more generating units, such as, for example, one or more rotating gas turbine generating units, coupled to the electric power system. For example, during a source rejection grid event, one or more generating units still coupled to the electric power system may initially experience a reduction in rotational speed as each generating unit attempts to compensate for the loss of generation power within the electric power system. Similarly, during a load rejection event, the power output by the prime movers of the generating units coupled to the electric power system may exceed the power required for the total electrical load on the electric power system, which may result in an increase in the rotational speed associated with one or more of the generating units. As the rotational speed of the generating units within the electric power system increases and decreases, the frequency of the alternating electrical current and/or the voltage developed by the generating units within the electric power system may fluctuate rapidly. For convenience, these frequency fluctuations may be referred to herein as rate-of-change-of-frequency events (or "RoCoF") events. RoCoF events therefore occur as a result of one or more grid events and may lead, as described herein, to the loss of one or more other generating units on the electric power system, which may contribute, in turn, to overall electric power system instability. In addition, as described herein, RoCoF events are associated with RoCoF values, such as values ranging from zero to two Hertz/second. In some embodiments, a RoCoF value may indicate a severity of an associated RoCoF event.

Accordingly, the systems and methods described herein facilitate ride-through, by one or more generating units coupled to the electric power system, in response to the occurrence of high RoCoF events within the electric power system. More particularly, the systems and methods described herein provide a substantially real-time generating unit control scheme and enable prompt and effective corrective action for generating units to ride-through high RoCoF events in electric power systems.

FIG. 1 is a schematic view of an exemplary electric power system 100. In the exemplary embodiment, electric power system 100 includes a plurality of generating units and a plurality of electrical loads coupled, as described herein, to the plurality of generating units. Although three generating units and three loads are shown with respect to FIG. 1, any number of generating units, loads, and other common electric power system components are contemplated by and within the scope of the present disclosure.

Accordingly, electric power system 100 includes one or more electrical system components, such as a first electrical load 102a, a second electrical load 102b, and/or a third electrical load 102c. Electric power system 100 also includes one or more generating units, such as a first generating unit 104a, a second generating unit 104b, and/or a third generating unit 104c. In the exemplary embodiment, generating units 104a-104c are synchronously connected gas turbine generating units. However, in other embodiments, generating units 104a-104c may be any generating unit that includes a rotating prime mover, such as steam turbine generating units, reciprocating engine generating units, hydro-turbine generating units, and the like.

In addition, in various embodiments, electric power system 100 may include at least one electrical power transmission and distribution system component 106, such as, for example, one or more transmission lines, one or more distribution lines, one or more transformers, one or more voltage regulators, and the like. An interconnected electrical power transmission and distribution system component 106 may thus facilitate the supply of electrical power from generating units 104a-104c to one or more electrical loads 102a-102c.

Electric power system 100 also includes at least one non-synchronous power source 112, such as a wind and/or a solar power generation system. Non-synchronous power source 112 may be coupled to electrical power transmission and distribution system component 106 through a power line, such as an non-synchronous source line 113, and as described above, may supply electrical energy to one or more electrical loads 102a-102c via electrical power transmission and distribution system component 106.

In addition, in the exemplary embodiment, each generating unit 104a-104c includes at least one controller and/or at least one sensor. More particularly, generating unit 104a includes a controller 114a and a sensor 116a, generating unit 104b includes a controller 114b and a sensor 116b, and generating unit 104c includes a controller 114c and a sensor 116c. Each controller 114a-114c may include a processor (not shown) and a tangible, non-transitory, computer-readable memory (not shown) communicatively coupled to the processor.

In the exemplary embodiment, electric power system 100 also includes a plurality of event estimators 120a, 120b, and 120c. In various embodiments, each event estimator 120a-120c includes at least one processor and is installed within a particular generating unit 104a-104c. In some embodiments, each event estimator 120a-120c is not a separate hardware component but is embodied as software that executes on a respective controller 114a-114c of each generating unit 104a-104c. In addition, in some embodiments, each event estimator 120a-120c may be implemented on a standalone computing device that is communicatively coupled to a respective controller 114a-114c of each generating unit 104a-104c.

Electric power system 100 also includes at least one network estimator 118. In various embodiments, network estimator 118 includes at least one processor 152 coupled to at least one tangible, non-transitory, computer-readable memory 154. In some embodiments, network estimator 118 may be implemented on a computing device, such as a workstation computer, a personal computer, a tablet computer, a smart phone, and the like.

In the exemplary embodiment, network estimator 118 is communicatively coupled (e.g., over a communications network, such as the internet) to one or more data sources 150, such as one or more databases and/or database servers. Data sources 150 may be online and/or offline data sources and may include or store a variety of information associated with electric power system 100, such as a variety of status information, as described below. Network estimator 118 may also be communicatively coupled to each event estimator 120a-120c.

The status information received by network estimator 118 via data sources 150 may include any status information associated with electric power system 100, such as, for example, location information, timing information, and/or maintenance activity information, such as scheduled outage information for at least one of generating units 104a-104c, electrical loads 102a-102c, electrical power transmission and distribution system component 106, and/or non-synchronous power source 112. Status information may also include information describing rotational inertia associated with each generating unit 104a-104c, a total rotational inertia associated with generating units 104a-104c within electric power system 100, and/or a proportion of electrical power being generated at any given time in electric power system 100 by non-synchronous power source 112. This status information may be transmitted over a computer network via at least one grid signal 122.

Status information may also be detected by one or more sensors within electric power system 100, such as, for example, sensors 116a-116c, which may detect an operational status of each generating unit 104a-104c, such as a rotational velocity, a temperature, an output voltage, an output current, an output frequency, valve position, a system identifier (e.g., a serial number), and/or a fuel type of generating units 104a-104c. Similarly, a sensor (not shown) coupled to electrical power transmission and distribution system component 106 may detect one or more characteristics thereof, such as, for example, at least one of a type, location, time of occurrence, and severity of a fault, a voltage, a current, a frequency, and a system identifier. Likewise, one or more sensors (not shown) coupled to electrical loads 102a-102c may detect characteristics thereof, such as, for example, an voltage, an current, an frequency, a location, at least one of a type, location, time of occurrence, and severity of a fault, and a system identifier.

The status information detected by one or more sensors with electric power system 100, such as by sensors 116a-116c, may also be used by controllers 114a-114c to detect the occurrence of a RoCoF event and/or a grid event within electric power system 100. For example, where a sensor 116a-116c detects a large increase or decrease in the frequency or speed of a corresponding generating unit 104a-104c, a respective controller 114a-114c may determine that a RoCoF event has occurred.

Accordingly, in the exemplary embodiment, network estimator 118 receives status information via grid signal 122 and determines (or obtains) at least one network characteristic representative of an operational status of electric power system 100, such as for, example, at least one frequency characteristic of electric power system 100. More particularly, network estimator 118 uses status information to generate at least one model of electric power system 100. For example, network estimator 118 may analyze the status information to generate a model of electric power system 100, such as a look-up table that correlates a plurality of RoCoF values with one or more electric power system characteristics, such as one or more frequency characteristics. The model may thus include and/or describe one or more characteristics of electric power system 100 and may represent one or more interrelationships between elements coupled to electric power system, such as between generating units 104a-104c and electrical loads 102a-102c. In addition, network estimator 118 may transmit all or a part of the model, such as a model look-up table, of electric power system 100 to each event estimator 120a-120c.

More particularly, the model of electric power system 100 may identify one or more characteristics of electric power system 100 and/or generating units 104a-104c, such as a settling frequency, a settling power, a frequency peak, and/or a frequency nadir. These characteristics may be based upon an analysis of the status information associated with electric power system 100. To this end, the model provided to each event estimator 120a-120c may include a look-up table that cross-references a plurality of RoCoF values with a plurality of characteristics, such as a plurality of settling frequencies, a plurality of settling powers, a plurality of frequency peaks, and/or a plurality of frequency nadirs. In general, a settling frequency and a settling power are the speed or frequency and the output power, respectively, into which a generating unit 104a-104c "settles" or stabilizes after the occurrence of a grid event and/or after a primary response to a RoCoF event and/or grid event has been deployed within electric power system 100. Similarly, a frequency nadir is the lowest output power frequency occurring as a result of a grid event, and a frequency peak is the highest output power frequency occurring as a result of a grid event. In the exemplary embodiment, the model may be transmitted via a network signal 124 to each event estimator 120a-120c, and each event estimator 120a-120c may store the model (including associated characteristics) in a memory, such as, for example, in a tangible, non-transitory, computer-readable memory.

In addition, network estimator 118 may receive and/or collect status information, as described above, on a periodic basis (e.g., once every fifteen minutes) to update the model of electric power system 100. The updated model may include updated characteristics associated with electric power system 100 and may be transmitted to one or more event estimators 120a-120c for storage, as described above. In various embodiments, network estimator 118 may receive feedback from one or more event estimators 120a-120c, such as feedback about an estimated characteristic in comparison to an actual or measured characteristic. For instance, a particular event estimator 120a-120c may use a look-up table (as described herein) to estimate a particular frequency nadir based upon a measured or sensed RoCoF value. The particular event estimator 120a-120c may, in addition, receive from a sensor 116a-116c, an actual frequency nadir occurring as a result of the RoCoF event, and an error or difference between the estimated frequency nadir and the actual frequency nadir may be returned as an error value to network estimator 118. Similarly, the actual frequency nadir (rather than, or in addition to, the error value) may be returned to network estimator 118.

FIG. 2 is a flow chart of an exemplary process 200 for controlling at least one generating unit 104a-104c during a RoCoF event. Accordingly, in the exemplary embodiment, network estimator 118 may receive status information associated with electric power system (step 202). As described above, status information may be stored in association with one or more database structures and may be acquired by network estimator 118 via one or more queries to these database structures. In addition, status information may include any status information associated with electric power system 100, such as one or more frequency characteristics associated with electric power system 100, location information, timing information, and/or maintenance activity information, such as scheduled outage information for at least one of generating units 104a-104c, electrical loads 102a-102c, electrical power transmission and distribution system component 106, and/or non-synchronous power source 112. Status information may also include information describing rotational inertia associated with each generating unit 104a-104c, a total rotational inertia associated with generating units 104a-104c within electric power system 100, and/or a proportion of electrical power being generated at any given time in electric power system 100 by non-synchronous power source 112

In the exemplary embodiment, network estimator 118 may determine, based upon the status information, at least one characteristic of electric power system 100, such as, for example, at least one frequency characteristic of each generating unit 104a-104c (step 204). As described above, each characteristic may be determined based upon an analysis of the status information and may represent an estimated or expected characteristic of each generating unit 104a-104c in response to a particular RoCoF event. Thus, network estimator 118 may generate a look-up table that includes a list of estimated characteristics for electric power system 100, such as for each generating unit 104a-104c, where the list of estimated frequency characteristics are associated with, or identify, a particular RoCoF value.

Thus, one or more characteristics may be determined by network estimator 118 and organized in a model, such as, for instance a look-up table. The look-up table may, in addition, be transmitted to one or more event estimators 120a-120c and/or to one or more controllers 114a-114c of each generating unit 104a-104c (step 206), and each event estimator 120a-120c and/or each controller 114a-114c may access the look-up table in response to a RoCoF event, such as a RoCoF event detected by a particular controller 114a-114c in response to sensor data received from one of sensors 116a-116c, as described above. More particularly, where a controller 114a-114c detects a RoCoF event, the controller 114a-114c and/or associated event estimator 120a-120c may access the look-up table provided by network estimator 118 to locate the detected RoCoF event (based upon a RoCoF value associated with the RoCoF event) in the look-up table. As described above, the model (e.g., the look-up table) may include one or more characteristics (e.g., a settling frequency, a settling power, a frequency peak, frequency nadir, a rotational speed peak, and/or a rotational speed nadir) for the detected RoCoF event, which the controller 114a-114c (and/or event estimator 120a-120c) detecting the RoCoF event may use to select a control action or operational mode for its respective generating unit 104a-104c. The control action or operational mode may, for example, be a control action or operational mode that causes one of generating units 104a-104c to increase and/or decrease a supply of fuel to its combustion chamber, which may, in turn, cause generating unit 104a-104c to produce increased and/or decreased output power in response to the detected RoCoF event.

FIG. 3 shows an exemplary look-up table 300, which is an example of a model. Although look-up tale 300 provides a specific example to facilitate understanding, in general terms, a model, such as a look-up table, may correlate electric power system 100 characteristics to RoCoF values based upon a predefined function or computation, such as, for example, and in general terms, as follows:

Frequency Nadir=function1 (RoCoF)
Frequency Peak=function2 (RoCoF)
Settling Power=function3 (RoCoF)
Settling Frequncy=function4 (RoCoF)

Accordingly, look-up table 300 correlates a plurality of RoCoF values 302 with a plurality of electric power system characteristics, such as a plurality of frequency nadirs 304, a plurality of settling powers 306, a plurality of settling frequencies 308, a plurality of frequency peaks (not shown), a plurality of rotational speed nadirs (not shown), and/or a plurality of rotational speed peaks (not shown). These characteristics 304-308 represent estimates of electric power system 100 performance in response to various RoCoF events. In addition, and as described herein, during operation, a particular event estimator 120a-120c and/or controller 114a-114c may determine, via look-up table 300, a characteristic, such as a frequency nadir 304, a settling power 306, a settling frequency 308, and/or a frequency peak (not shown), based upon an observed RoCoF value 302.

The above-described systems and methods thus facilitate ride-through, by one or more generating units coupled to the electric power system, in response to the occurrence of RoCoF events within the electric power system. More particularly, the systems and methods described herein provide a substantially real-time generating unit control scheme and enable prompt and effective corrective action for generating units to ride-through RoCoF events in electric power systems.

Exemplary technical effects of the systems and methods described herein include: (a) providing for generating unit ride-through after RoCoF events in an electric power system; (b) improving the capability of synchronous generating units to ride-through high RoCoF grid events, including in electric power systems having non-synchronous generating units; (c) increasing operational efficiency and availability of electric power systems and decreasing outage times and maintenance costs of such systems; (d) lessening the potential for brownouts, blackouts, and other costly outages in electric power systems; and (e) providing a substantially real-time control scheme to controllers of a synchronous generating units within an electric power system to enable prompt and effective corrective action to ride-through high RoCoF events.

Exemplary embodiments of systems and methods for high RoCoF ride-through in electric power systems are described above in detail. The above-described systems and methods are not limited to the specific embodiments described herein, but rather, components of systems or steps of the methods may be utilized independently and separately from other components or steps described herein. For example, the methods may also be used in combination with a plurality of electrical grid systems spanning multiple regions through, for example, one or more grid interconnects, and are not limited to practice with only a single electrical grid system as described herein. Rather, the exemplary embodiments may be implemented and utilized in connection with many other systems requiring system-wide regulation for improved operation as described herein. In some other embodiments, the methods and systems described herein may be used with other ancillary services and any other type of utility generation system.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric power system comprising:
a generating unit comprising a controller for controlling an operational mode of said generating unit;
an event estimator communicatively coupled to said controller of said generating unit; and
a network estimator communicatively coupled to said event estimator, said network estimator comprising a processor configured to:
receive status information associated with said electric power system;
determine, based upon the status information, at least one network characteristic representing an operational status of said electric power system;
generate, based upon the at least one network characteristic and before a rate-of-change-of-frequency (RoCoF) event occurs, a model that identifies estimated characteristics of said electric power system in response to particular RoCoF events, wherein each estimated characteristic is associated with a particular RoCoF value and is compared with the respective at least one network characteristic based on a feedback to update the model; and
transmit the model to said event estimator to control said generating unit during the RoCoF event.

2. The electric power system of claim 1, wherein said controller is configured to determine a control action for said generating unit based upon the model.

3. The electric power system of claim 1, wherein said controller is configured to determine, in response to an RoCoF event and based upon the model, an operational mode of said generating unit.

4. The electric power system of claim 1, wherein said processor of said network estimator is further configured to generate, based upon the at least one network characteristic, the model that includes a plurality of lists of the estimated characteristics, each list representing a different characteristic of said electric power system in response to particular RoCoF events, wherein each estimated characteristic in each list is associated with a particular RoCoF value.

5. The electric power system of claim 1, wherein the estimated characteristics each represent a characteristic of said generating unit in response to a particular RoCoF event, and wherein the characteristic is selected from the group consisting of a frequency nadir of said generating unit, a rotational speed nadir of said generating unit, a rotational speed peak of said generating unit, a frequency peak of said generating unit, a settling power of said generating unit, and a settling frequency of said generating unit.

6. The electric power system of claim 1, wherein said processor of said network estimator is further configured to periodically determine, based upon the status information, at least one updated network characteristic of said electric power system.

7. The electric power system of claim 6, wherein said controller is further configured to periodically determine, based upon the at least one updated network characteristic, at least one updated control action for said generating unit.

8. A network estimator comprising:
   a processor; and
   a non-transitory, tangible, computer-readable memory having instructions stored thereon that, in response to execution by said processor, cause said processor to perform operations including:
      receiving status information associated with an electric power system;
      determining, based upon the status information, at least one network characteristic representing an operational status of said electric power system;
      generating, based upon the at least one network characteristic and before a rate-of-change-of-frequency (RoCoF) event occurs, a model that identifies estimated characteristics of said electric power system in response to particular RoCoF events, wherein each estimated characteristic is associated with a particular rate of change of RoCoF value and is compared with the respective at least one network characteristic based on a feedback to update the model; and
      transmitting the model to an event estimator of a generating unit to control the generating unit during the RoCoF event.

9. The network estimator of claim 8, wherein said network estimator comprises a standalone computing device.

10. The network estimator of claim 8, wherein said network estimator is communicatively coupled to at least one data source, and wherein said processor is further configured to perform operations including receiving, from the at least one data source, the status information.

11. The network estimator of claim 8, wherein said processor is further configured to perform operations including generating, based upon the at least one network characteristic, the model that includes a plurality of lists of the estimated characteristics, each list representing a different characteristic of the electric power system in response to particular RoCoF events, wherein each estimated characteristic in each list is associated with a particular RoCoF value.

12. The network estimator of claim 8, wherein the estimated characteristics each represent a characteristic of said generating unit in response to a particular RoCoF event, and wherein the characteristic is selected from the group consisting of a frequency nadir of the generating unit, a rotational speed nadir of the generating unit, a rotational speed peak of the generating unit, a frequency peak of the generating unit, a settling power of the generating unit, and a settling frequency of the generating unit.

13. The network estimator of claim 8, wherein said processor is further configured to perform operations including periodically determining, based upon the status information, at least one updated network characteristic of the electric power system.

14. The network estimator of claim 8, wherein said processor is further configured to perform operations including periodically querying at least one data source to receive updated status information.

15. A method comprising:
   receiving, by a processor configured to be communicatively coupled to an event estimator of a generating unit within an electric power system, status information associated with the electric power system;
   determining, by the processor and based upon the status information, at least one network characteristic representing an operational status of the electric power system;
   generating, by the processor and based upon the at least one network characteristic, and before a rate-of-change-of-frequency (RoCoF) event occurs, a model that identifies estimated characteristics of the electric power system in response to particular RoCoF events, wherein each estimated characteristic is associated with a particular RoCoF value and is compared with the respective at least one network characteristic based on a feedback to update the model; and
   transmitting, by the processor, the model to the event estimator of the generating unit to control the generating unit during the RoCoF event.

16. The method of claim 15, wherein a controller of the generating unit is configured to determine a control action for the generating unit based upon the model.

17. The method of claim 15, wherein a controller of the generating unit is configured to determine, in response to an RoCoF event and based upon the model, an operational mode of the generating unit.

18. The method of claim 15, further comprising generating, by the processor and based upon the at least one network characteristic, the model that includes a plurality of lists of the estimated characteristics, each list representing a different characteristic of the electric power system in response to particular RoCoF events, wherein each estimated characteristic in each list is associated with a particular RoCoF value.

19. The method of claim 15, wherein the estimated characteristics each represent a characteristic of the generating unit in response to a particular RoCoF event, and wherein the characteristic is selected from the group consisting of a frequency nadir of the generating unit, a rotational speed nadir of the generating unit, a rotational speed peak of the generating unit, a frequency peak of the generating unit, a settling power of the generating unit, and a settling frequency of the generating unit.

20. The method of claim 15, further comprising periodically determining, by the processor and based upon the status information, at least one updated network characteristic of the electric power system.

\* \* \* \* \*